US010895273B2

(12) United States Patent
Storz et al.

(10) Patent No.: US 10,895,273 B2
(45) Date of Patent: Jan. 19, 2021

(54) HYDRAULIC LIFTING COLUMN

(71) Applicant: HAWE Altenstadt Holding GmbH, Altenstadt (DE)

(72) Inventors: Martin Storz, Schwabsoien (DE); Gerhard Rinninger, Kaufbeuren (DE); Erich Rankl, Rott (DE); Thomas Stockmeier, Regensburg (DE); Christian Hart, Nittendorf (DE); Danny Aurich, Deggendorf (DE)

(73) Assignee: HAWE Altenstadt Holding GmbH, Altenstadt (DE)

( * ) Notice: Subject to any disclaimer, the term of this patent is extended or adjusted under 35 U.S.C. 154(b) by 0 days.

(21) Appl. No.: 16/592,957

(22) Filed: Oct. 4, 2019

(65) Prior Publication Data

US 2020/0141430 A1   May 7, 2020

(30) Foreign Application Priority Data

Nov. 2, 2018   (DE) ......................... 10 2018 127 389

(51) Int. Cl.
*F15B 15/14*   (2006.01)
*B66F 7/20*   (2006.01)
(Continued)

(52) U.S. Cl.
CPC .......... *F15B 15/1404* (2013.01); *F15B 15/02* (2013.01); *F15B 15/1409* (2013.01);
(Continued)

(58) Field of Classification Search
CPC .. F15B 15/1409; F15B 15/1404; F15B 11/22; B66F 3/46; B66F 7/04; B66F 7/20; B66F 7/22
(Continued)

(56) References Cited

U.S. PATENT DOCUMENTS 2,655,115 A * 10/1953 Holdeman ............... B61K 5/00
104/32.1
4,559,398 A   12/1985 Tesch et al.
(Continued)

FOREIGN PATENT DOCUMENTS

DE   196 12 091 C2   3/1997
DE   196 23 580 C2   12/1997
(Continued)

*Primary Examiner* — Nathaniel E Wiehe
*Assistant Examiner* — Michael Quandt
(74) *Attorney, Agent, or Firm* — Aslan Law, P.C.

(57) ABSTRACT

A hydraulic lifting column comprising a base structure, a head structure and a lifting structure. The lifting structure comprising a hydraulic power unit and hydraulic linear actuators extending between the base structure and the head structure, the hydraulic power unit acting on the hydraulic linear actuators. The lifting structure comprising four linear actuator units with a mutually parallel, vertically oriented working direction. Each linear actuator unit comprising a double cylinder having two-cylinder bores arranged next to one another and two piston structures with piston rods oriented parallel to one another and extendable in opposite directions from the double cylinder. The four lower piston rods are connected to the base structure at the corners of a first quadrilateral and the four upper piston rods are connected to the head structure at the corners of a second quadrilateral.

13 Claims, 8 Drawing Sheets

Figure 1:
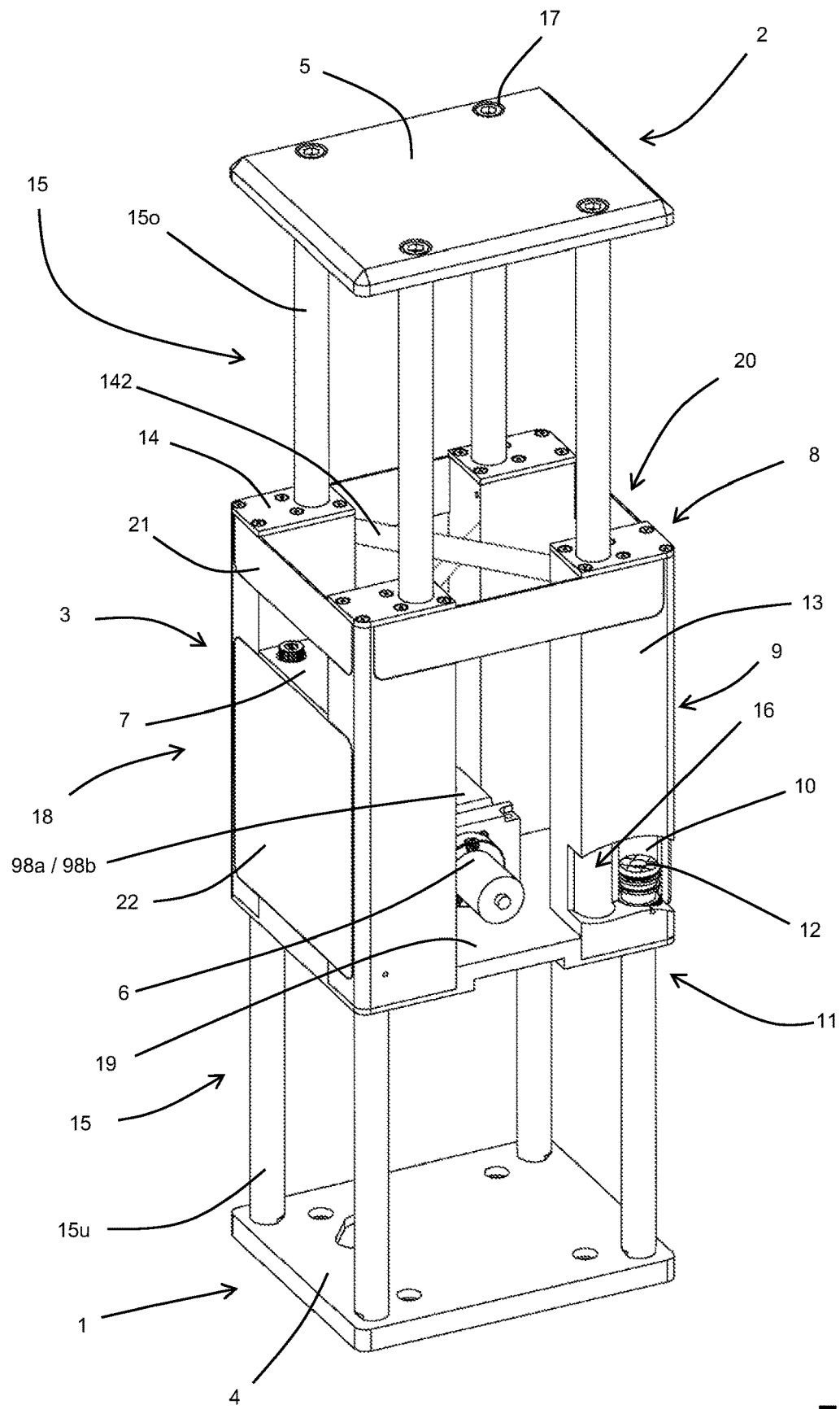

(51) Int. Cl.
*F15B 15/02* (2006.01)
*F15B 15/18* (2006.01)
*A61G 13/06* (2006.01)

(52) U.S. Cl.
CPC .............. *F15B 15/18* (2013.01); *A61G 13/06* (2013.01); *B66F 7/20* (2013.01)

(58) Field of Classification Search
USPC ..... 5/11, 600, 607, 608, 611, 612, 613, 614; 92/146, 117 A
See application file for complete search history.

(56) References Cited

U.S. PATENT DOCUMENTS

| | | | |
|---|---|---|---|
| 4,589,642 A * | 5/1986 | Schnelle | A61G 13/02 5/608 |
| 4,686,889 A * | 8/1987 | Hall | F15B 15/1409 384/42 |
| 5,398,356 A | 3/1995 | Pfleger | |
| 5,621,933 A | 4/1997 | Knapp et al. | |
| 6,886,200 B2 * | 5/2005 | Blyshak | A61G 13/02 254/93 R |
| 8,800,983 B2 | 8/2014 | Koch et al. | |
| 10,130,528 B2 * | 11/2018 | Valentino | A61G 7/0527 |
| 2007/0256555 A1 | 11/2007 | Koop | |
| 2016/0000620 A1 | 1/2016 | Koch | |

FOREIGN PATENT DOCUMENTS

| | | |
|---|---|---|
| DE | 10 2005 050 856 B4 | 4/2007 |
| DE | 10 2011 103 546 A1 | 12/2012 |
| EP | 0 139 110 | 2/1985 |
| EP | 0139118 B1 | 3/1988 |
| EP | 1 852 384 B1 | 11/2007 |
| EP | 2 962 673 A1 | 1/2016 |

* cited by examiner

HYDRAULIC LIFTING COLUMN

CROSS-REFERENCE TO RELATED APPLICATIONS

This application claims priority to German Patent Application No. 10 2018 127 389.4 filed on Nov. 2, 2018, the entire contents of which are hereby incorporated by reference.

DESCRIPTION

The present invention relates to a hydraulic lifting column, which is used in particular in the medical field (e.g. for operating tables and treatment couches) and comprises a base structure, a head structure and a lifting structure extending between the base structure and the head structure, the lifting structure comprising hydraulic linear actuators and a hydraulic power unit acting upon them.

With regard to such hydraulic lifting columns, there is a vast state of the art. Reference is made, for example, to EP 0 139 118 B1, U.S. Pat. No. 5,621,933 A, DE 196 23 580 C2, DE 196 12 091 C2, EP 2 962 673 A1, U.S. Pat. No. 8,800,983 B2, U.S. Pat. No. 5,398,356 A, DE 10 2005 050 856 B4, DE 10 2011 103 546 A1 and EP 1 852 384 B1.

Despite the obvious abundance of different concepts and designs, there is still a need for a hydraulic lifting column that meets the practical requirements of modern medical technology to a sufficient degree. Such requirements include in particular robustness, loading capacity and possible total lift, reliability, ease of maintenance and hygiene. Particularly in the medical field, low noise generation during lifting/lowering and a particularly smooth, jerk-free start of the lifting/lowering movement are also important. A further relevant aspect is the cost, whereby a high degree of flexibility with regard to the possible applications of the lifting column has a cost-reducing effect—as a result of the quantities then possible during production. In the foregoing sense, this invention is aimed at providing a hydraulic lifting column of the type mentioned above which is particularly suitable for practical use, i.e. which satisfies the criteria set out above in a balanced manner.

According to the present invention, the above-mentioned problem is solved by the hydraulic lifting column according to claim 1. Accordingly, a hydraulic lifting column, which, according to the state of the art, also has a base structure, a head structure and a lifting structure extending between the base structure and the head structure comprising hydraulic linear actuators and a hydraulic power unit acting upon the linear actuators, is characterized by the following features:

The lifting structure comprises four linear actuator units with mutually parallel, vertically oriented working directions. Each linear actuator unit comprises a double cylinder with two cylinder bores arranged side by side and two piston structures with parallel piston rods which can be extended in opposite directions from the double cylinder. The four lower piston rods are connected to the base structure at the corners of a first quadrilateral and the four upper piston rods are connected to the head structure at the corners of a second quadrilateral.

Due to the inventive design of the hydraulic lifting column, the four linear actuator units in particular can form the only geometric guide of the head structure relative to the base structure. In other words, in implementing the present invention, separate guiding devices, i.e. separate linear guides such as dovetail guides, ball screw guides or the like, can be omitted without impairing the functionality and practicality of the lifting column in the sense of the criteria listed above. The practical suitability of the lifting column can benefit from this to a considerable extent in many different ways. This allows lifting columns to be provided at comparatively low cost with a particularly low weight and space requirement in terms of loading capacity and performance, as well as low maintenance requirements. In addition, the static friction to be overcome when starting to lift or lower is reduced. This enables a particularly smooth, conserving and quiet start of the lifting or lowering movement with high energy efficiency. Compared to lifting columns with separate guide devices in addition to the hydraulic linear actuators, the risk of colonization of the lifting column with germs and bacteria is also reduced, which can be particularly important in the medical application sector and especially if the lifting structure is not covered or encapsulated, for example by means of a bellows structure.

In the interest of a particularly favorable statics of the lifting column in accordance with the invention, it is advantageous if, according to a first preferred further embodiment of the present invention, the first quadrilateral is larger in area than the second quadrilateral. The two quadrilaterals can be designed as rectangles in particular. This is advantageous for the practical suitability in the sense of the above criteria as it allows the load to be distributed as evenly as possible between the four linear actuator units.

According to another preferred further embodiment of the invention, the double cylinders each have a one-piece base body in which the two cylinder bores are executed. The one-piece design of the base bodies results in alternating stiffening effects—compared with the design of the double cylinders, which is also basically possible within the scope of the invention by rigid connection of the cylinder components of two separate single cylinders—so that even particularly high static requirements (especially with regard to bending and torsional stiffness) can be met with very compact linear actuator units.

The four double cylinders can be part of a fixed cylinder assembly, according to a particularly preferred further embodiment. Here, in other words, the four double cylinders are connected to each other to form a rigid unit in such a way that they do not move relative to each other and can only be raised or lowered together—as a unit—during the lifting or lowering movement. The said cylinder assembly may also include the hydraulic power unit, again in preferred embodiment. Unlike in the case of the integration of the hydraulic power unit into the base structure, which is also possible within the scope of this invention, no flexible hydraulic lines between the base structure and the double cylinders are required to compensate for the lifting movement. Rather, only electrical lines (control lines or supply lines) need to extend between the base structure and the unit comprising the cylinder assembly which moves relative to it, i.e. raises and lowers, in this case, unless an additional electrical supply battery is accommodated in the said unit. This is a very relevant advantage. In addition, when the hydraulic power unit is accommodated in the unit comprising the cylinder assembly, it is even possible to implement a direct hydraulic coupling of the double cylinders to the hydraulic power unit, if necessary without hoses at all.

The cylinder assembly provided in accordance with embodiment of the invention described above may—in implementation of a further preferred design—in particular include a base plate on which the double cylinders are mounted. The said base plate may be the supporting component of the above unit comprising the cylinder assembly, in particular in that the motor-pump unit of the hydraulic power unit is mounted between the double cylinders on the base plate. In addition to the static function, the base plate may also be part of the hydraulic system, in particular by accommodating valves and/or other hydraulically active components, preferably in hydraulic lines, which hydraulically connect the motor-pump unit of the hydraulic power unit to the tank and/or to the double cylinders.

The cylinder assembly or the unit comprising it shall preferably have a circumferential stiffening structure extending over and connecting the four double cylinders. This stiffening structure may include in particular stiffening sheets and/or stiffening webs. Struts connecting two double cylinders to each other and running along the circumference of the cylinder assembly are particularly preferred. As an alternative or in addition to a circumferential stiffening structure in the above sense, the double cylinders can also be stiffened diagonally crosswise against each other 142.

A further advantage of the design of the invention described above, in which the cylinder assembly comprises the hydraulic power unit, is that a tank belonging to the hydraulic power unit can connect two double cylinders, stiffening them against each other. In this case, the tank performs the additional function of reinforcing or stiffening the cylinder assembly. A separate stiffening structure connecting the double cylinders can therefore be less complex in some cases by including the tank belonging to the hydraulic power unit in the stiffening structure. This in turn favors a particularly compact design.

To allow for a high energy efficiency, it may be provided that the hydraulic lifting column according to the present invention can be switched between a first operating mode in which all four linear actuator units can be actively actuated by the hydraulic power unit and a second operating mode in which only two of the four linear actuator units can actively be actuated by the hydraulic power unit. In other words, it is preferable to switch an operating mode in which only two of the four linear actuator units can be actively actuated by the hydraulic power unit. In this second operating mode, in which only two linear actuator units lift and lower the head structure and which can be controlled (automatically, if necessary) especially when the lifting load is comparatively low, the two linear actuator units that are not actively loaded are switched to a virtually "floating position"; however, in this operating mode they also contribute to the mechanical guidance of the head structure and the base structure relative to each other. In individual cases, for suitable applications, the present invention can be implemented in such a way that only two of the four linear actuator units can be actively loaded by the hydraulic power unit in the lifting column.

According to another preferred further embodiment of the invention, the two cylinders of each double cylinder (or of the two actively actuated double cylinders) are preferably coupled together in hydraulic parallel connection. The two cylinders, permanently hydraulically communicating with each other, of each (pressurized or pressurizeable) double cylinder are constantly pressurized identically. Without hydraulically active elements (such as valves or the like), which influence or control the application of pressure to the individual cylinders of the respective double cylinder, it can be "left" to the system to decide whether the supply of hydraulic fluid to the four double cylinders only extends the upper piston rods, extends the lower piston rods or simultaneously extends both the upper and lower piston rods. In the—preferred-case that both cylinders of each double cylinder are identical in cross-section, a certain inherent priority may be given to the extension of the upper piston rods; because of the dead weight of the cylinder assembly, the load resting on the lower piston rods is slightly greater than the load resting on the upper piston rods. Accordingly, when the lifting column is lowered with hydraulic fluid drawn from the four double cylinders, the lower piston rods are first retracted until they stop before the upper piston rods retract.

The four (or if necessary two) linear actuator units are also pressurized by the hydraulic power unit preferably in hydraulic parallel connection. However, the motor-pump unit of the hydraulic power unit is particularly preferred to be followed by a flow divider, which distributes the hydraulic fluid pumped evenly over the four (or possibly two actively pressurized) double cylinders. In this way, synchronization of the four linear actuator units can be ensured even in off-center load situations of the lifting column. This significantly reduces the risk of internal stresses in the lifting column due to off-center load conditions.

Another preferred further embodiment of the invention is characterized in that at least one check valve is arranged in the hydraulic connection of the motor-pump unit of the hydraulic power unit with the group of four linear actuator units. A check valve of this type, which can in particular be designed in a particularly preferred manner as a hydraulically pilotable non-return valve or a switchable 2/2-way seat valve, can be used in particular to lock the hydraulic fluid in the double cylinders, thereby counteracting a sinking of the head structure when the hydraulic power unit is fed zero. This enables reliable holding of the respective lifting position without energy expenditure. Four such check valves are particularly preferred, whereby each linear actuator unit is assigned exactly one such check valve specifically. In this way, a "cross-flow" of hydraulic fluid between the individual linear actuator units can be prevented—in response to a displacement of the load application point on the head structure—so that the lifting column is hydraulically locked or arrested particularly reliably in the adjusted position. The fact that the lifting column in this case does not require mechanical locking is another aspect that favors its suitability for practical use. The locking can be released by actuating the control input of at least one hydraulically pilotable non-return valve or by actuating the 2/2-way seat valve accordingly.

In particular, when using the lifting column according to the invention in the medical application environment mentioned several times above, the head structure of the lifting column preferably includes a preferably cardanic lying surface suspension. In a particularly preferred configuration, the head structure comprises a head frame to which the four upper piston rods are attached, a crosshead and a bearing unit which serves to support the lying surface, whereby the crosshead is mounted on the head frame so as to be pivotable about a first pivot axis and the bearing unit on the crosshead about a second pivot axis. In this way, it is possible to obtain to a particularly large extent several of the advantages set out above, resulting from the design of the lifting column in accordance with the invention. This applies in particular to a particularly compact design, especially when the first and second pivot axes intersect each other, i.e. lie in one plane or are only minimally spaced from each other. This is particularly advantageous if the first and second pivot axes lie within the range defined by the height extension of the head frame.

Preferably, the cardanic lying surface suspension has a first swivel drive effective between the head frame and the crosshead and a second swivel drive effective between the crosshead and the bearing unit. In a particularly advantageous design, the two swivel drives are designed as linear drives, in particular as hydraulic linear drives (hydraulic cylinders), and are arranged within the space enclosed by the four upper piston rods. In synergetic interaction with the inventive design of the lifting structure, this housing makes optimum use of the space between the upper piston rods.

Preferably, a first swivel drive carrier preferably projects downwards from the head frame and/or a second swivel drive carrier preferably projects downwards from the crosshead. On the first swivel drive carrier, the first swivel drive, which acts on the crosshead to adjust the crosshead relative to the head frame around the first pivot axis, is supported in an articulated manner. And on the second swivel drive carrier, the second swivel drive, which acts on the bearing unit to adjust the bearing unit relative to the crosshead about the second pivot axis is supported in an articulated manner. From the point of view of kinematics, it is particularly advantageous if a steering arm protrudes from the second swivel drive carrier and is engaged by the first swivel drive. Thus, such geometric conditions can be realized which allow the provision of the force required to pivot the (loaded) lying surface around the first pivot axis over the entire desired pivot range by means of a comparatively compact first swivel drive.

The cardanic lying surface suspension integrated into the head structure of the hydraulic lifting column, as explained in detail above, can also be used, as an expert can easily see from the corresponding explanations, for hydraulic lifting columns in which—particularly due to a comparatively small required stroke—each linear actuator unit does not comprise a double cylinder and two piston structures with piston rods oriented parallel to each other and extendable in opposite directions from the double cylinder, but rather a single hydraulic cylinder in each case. In such an implementation of the invention, the (only) piston rod of the respective single hydraulic cylinder acts, depending on the installation position of the linear actuator unit concerned, i.e. depending on the fixing of the cylinder part concerned to the base structure or to the head structure, as the upper piston rod or as the lower piston rod in the sense of the above explanations relating to the double-cylinder linear actuator units, the last of which, moreover, applies mutatis mutandis, insofar as they do not clearly contradict the design of the linear actuator units as single hydraulic cylinders.

Figure 2:
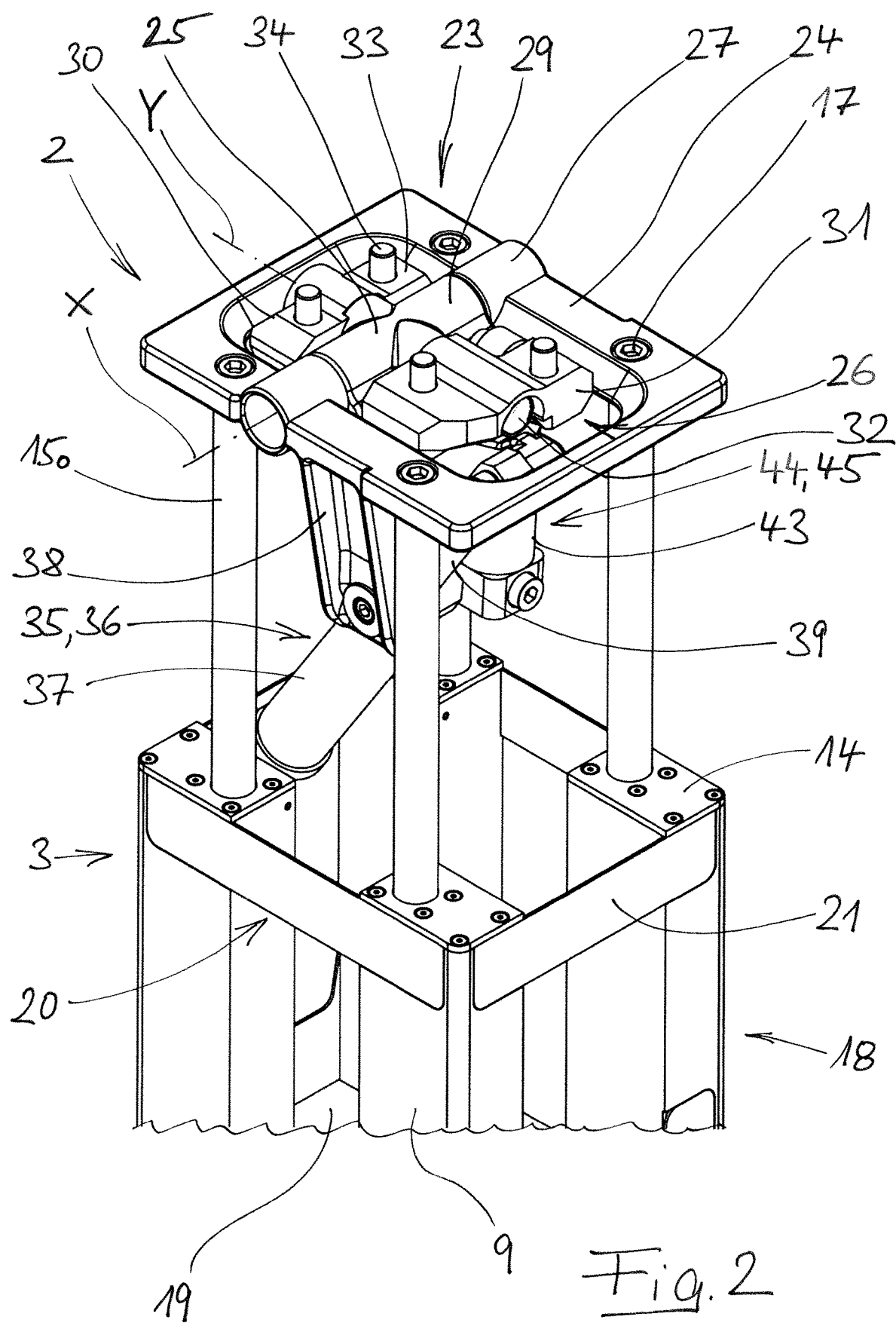
Figure 3:
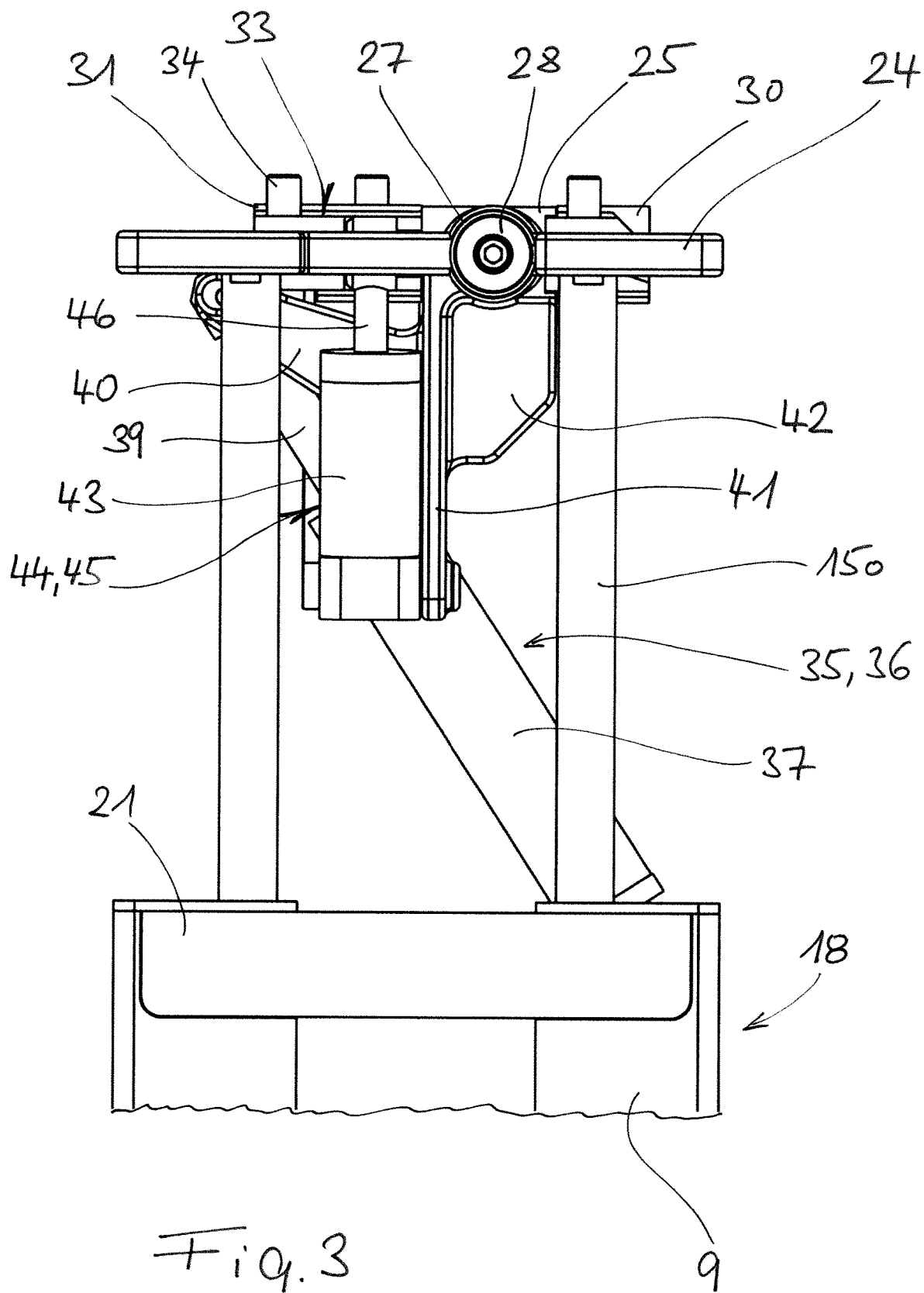
Figure 4:
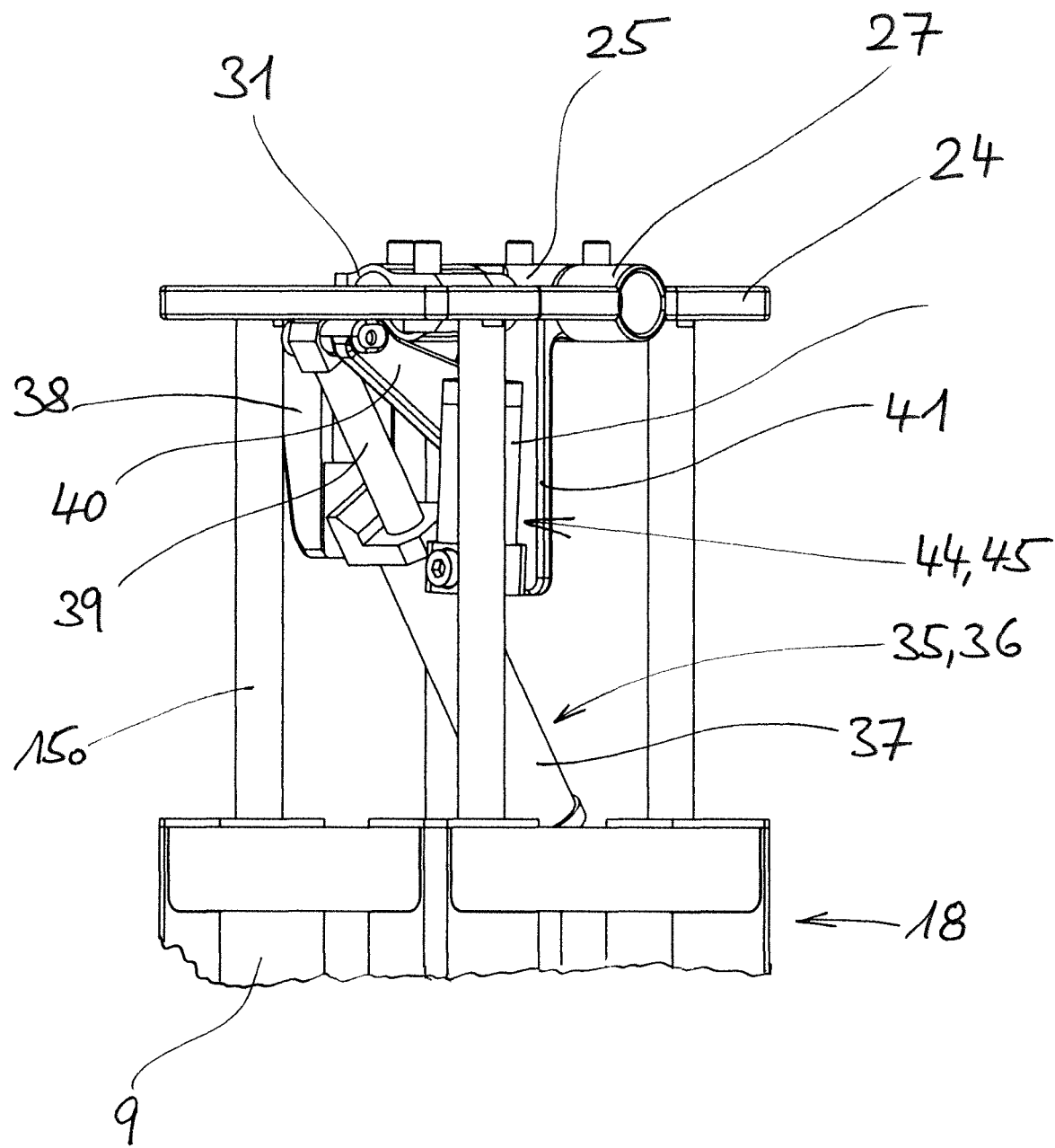
Figure 5:
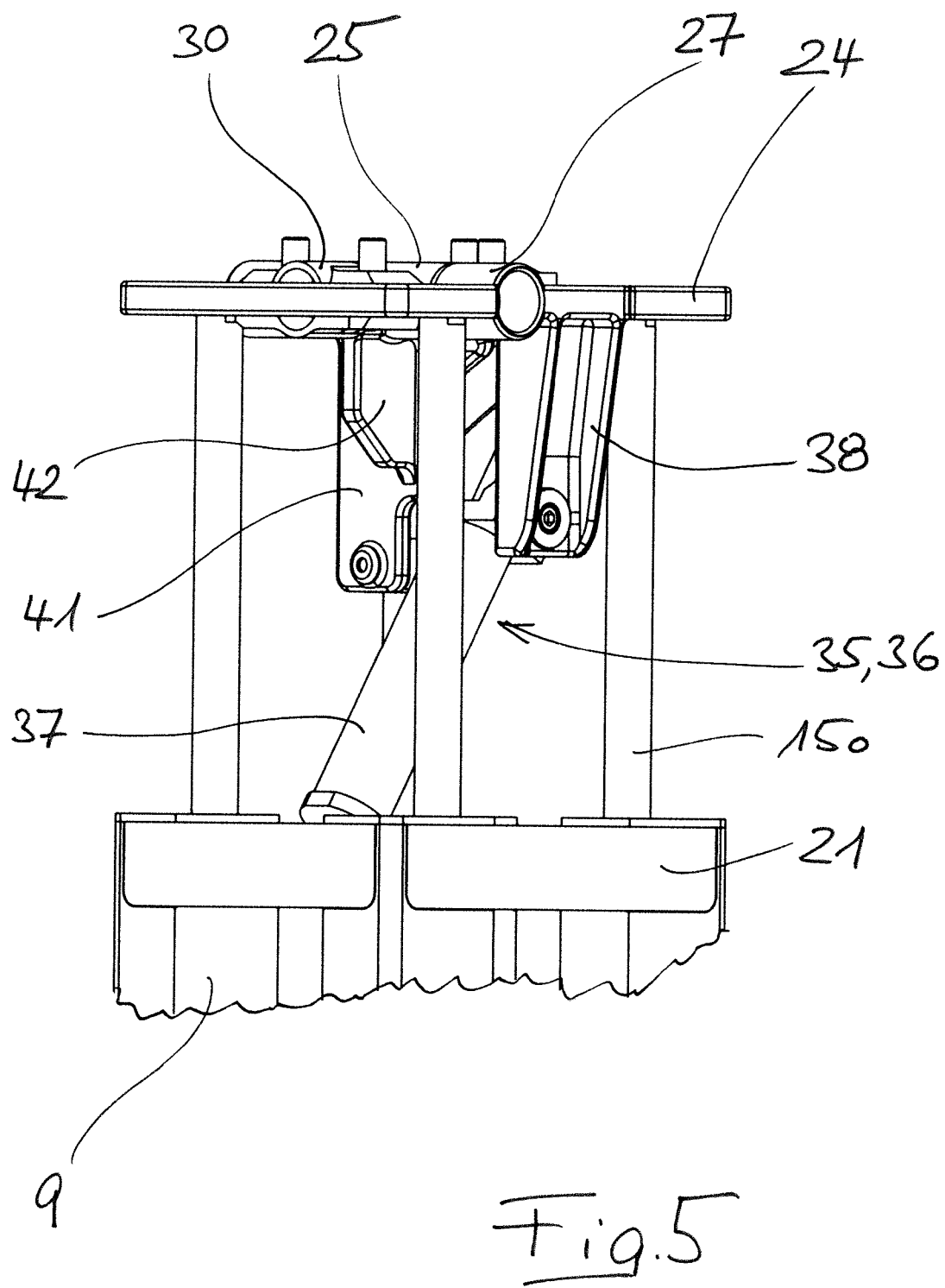
Figure 6:
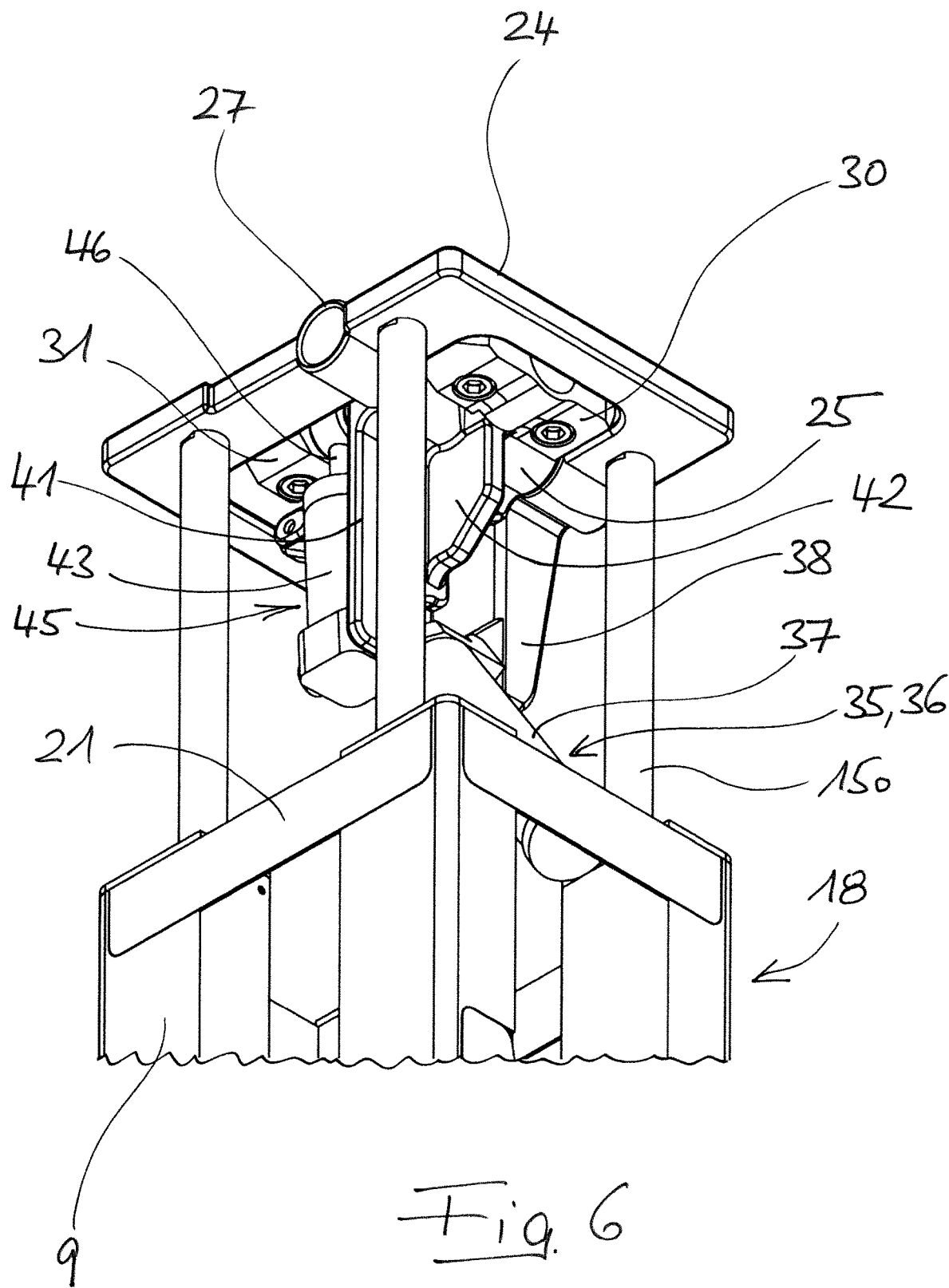
Figure 7:
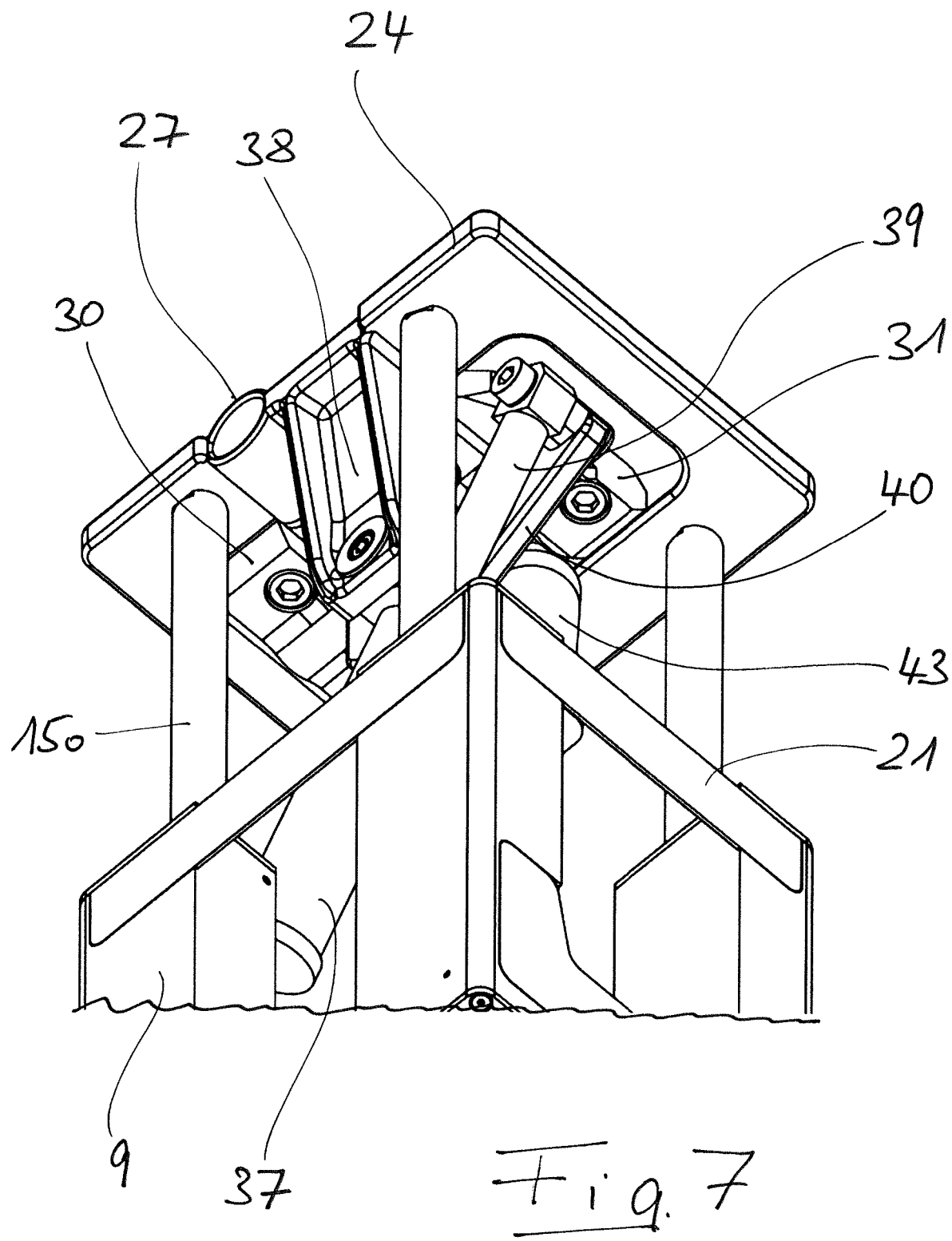

In the following, this invention will be explained in more detail by describing two preferred exemplary embodiments. Thereby FIG. 1 is a perspective overall view diagonally from above of a first hydraulic lifting column according to the invention, FIG. 2 is a detailed view diagonally from above of the head structure of a second hydraulic lifting column according the invention, FIG. 3 is a first detailed side view of the head structure according to FIG. 2, FIG. 4 is a second detailed side view of the head structure according to FIGS. 2 and 3, FIG. 5 is a third detailed side view of the head structure according to FIGS. 2 to 4, FIG. 6 is a first detail view diagonally from below of the head structure according to FIGS. 2 to 5 and FIG. 7 is a second detail view diagonally from below of the head structure according to FIGS. 2 to 6.

Figure 8:
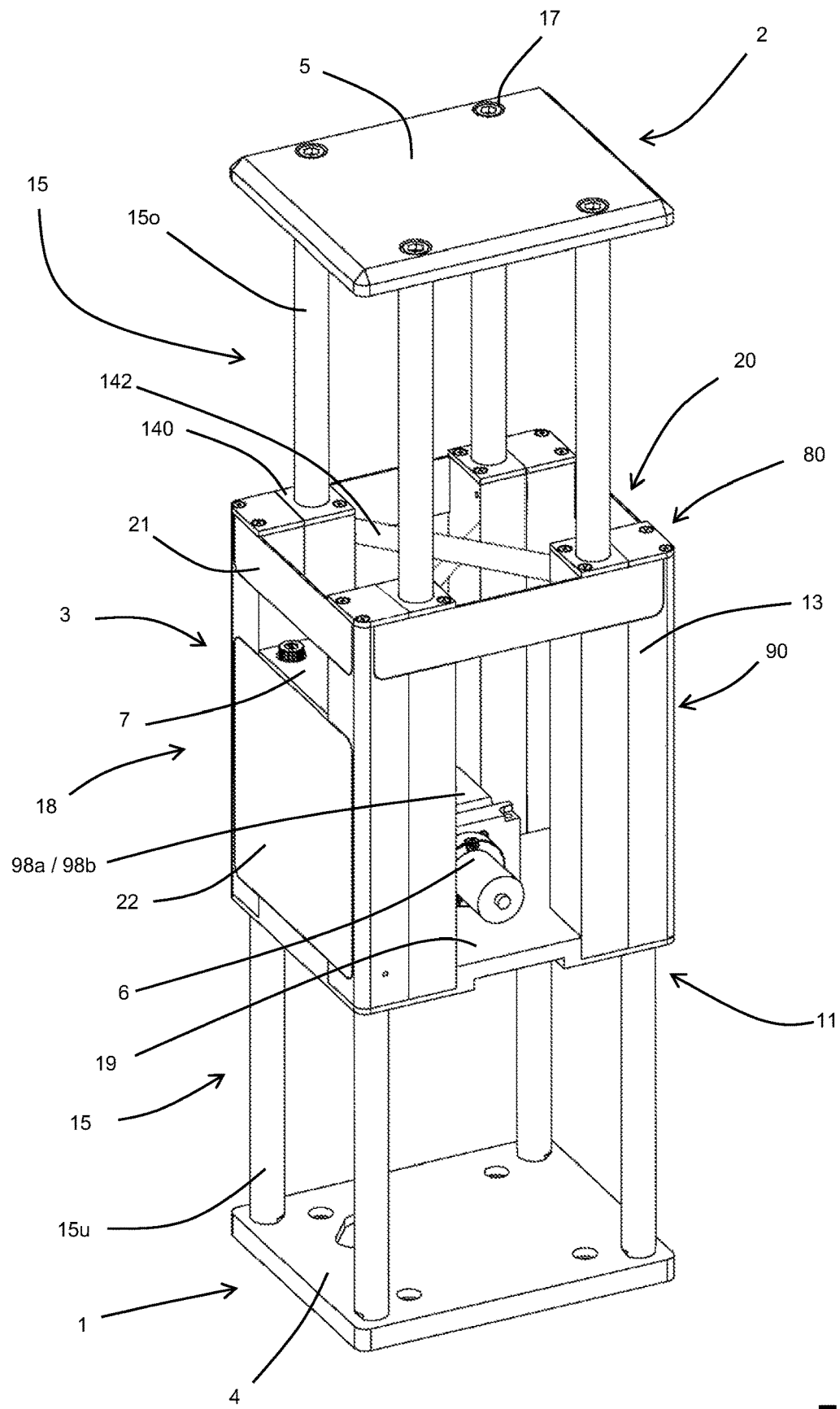

FIG. 8 is a view of a hydraulic lifting column according to the invention.

The hydraulic lifting column illustrated in FIG. 1 comprises a base structure 1, a head structure 2 and a lifting structure 3 extending between the base structure 1 and the head structure 2. The base structure 1 is illustrated as base plate 4. And the head structure 2 is shown in a corresponding way as head plate 5. Other configurations of the base structure 1 and the head structure 2, specifically adapted to the respective application, are possible, as will be explained in more detail below with reference to the exemplary embodiment illustrated in detail in FIGS. 2 to 7.

The lifting structure 3 is of hydraulic type. It thus has hydraulic linear actuators and a hydraulic power unit acting upon them, which in turn comprises an electrically driven motor-pump unit 6 and a tank 7. In implementation of the present invention, the lifting structure 3 comprises four linear actuator units 8, each of these four linear actuator units 8 comprising a double cylinder 9 having two parallel cylinder bores 10 and two piston structures 11 with pistons 12 sealingly guided in said cylinder bores 10, the double cylinders 9 each having a one-piece body 13 and an upper end plate 14 connected thereto, the two cylinder bores 10 being formed in the one-piece body 13.

The two piston structures 11 of each linear actuator unit 8 are also oriented parallel to each other in accordance with the two cylinder bores 10. They have extendable piston rods 15, namely a lower piston rod 15$u$ and an upper piston rod 15$o$, which can be extended in opposite directions from the double cylinder 9. In each double cylinder 9, the two working chambers 16, which are supplied with hydraulic fluid to extend the assigned piston rod 15, communicate constantly with each other via a connecting line, so that the two cylinders of each double cylinder are coupled to each other in hydraulic parallel connection.

In accordance with the parallel offset of the two cylinder bores 10 of each double cylinder 9, the assigned piston rods 15 are also offset parallel to each other. The upper piston rod 15$o$ exits from the double cylinder 9 through a hole provided in the upper end plate 14 of the respective double cylinder 9. The four lower piston rods 15$u$ are rigidly connected to the base plate 4 at the corners of a first quadrilateral, and the four upper piston rods 15$o$ are rigidly connected to the head plate 5 at the corners of a second quadrilateral, which is smaller than the first quadrilateral. The corresponding fixing screws 17 are illustrated.

The four double cylinders 9 are part of a rigid cylinder assembly 18 of approximately cuboid basic shape. For this purpose they are mounted on a rectangular base plate 19—with parallel, vertically oriented working direction—in its corner areas. The cylinder assembly 18 also comprises a circumferential stiffening structure 20 extending over and connecting the four double cylinders 9, which is realized by four struts 21 connecting two adjacent double cylinders 9 in their upper end area.

The cylinder assembly 18 also includes the hydraulic power unit used to pressurize the four linear actuator units. For this purpose, the motor-pump unit 6 of the hydraulic power unit is mounted between the double cylinders 9 on the base plate 19 of the cylinder assembly 18. A tank 7 belonging to the hydraulic power unit is arranged between two adjacent double cylinders 9. Part of tank 7 is a sheet 22, which connects the two adjacent double cylinders 9, stiffening them against each other (e.g., 142).

Hydraulic lines are integrated into the base plate 19, which hydraulically connect the motor-pump unit 6 of the hydraulic power unit on the one hand with the tank 7 and on the other hand with the four double cylinders 9. The hydraulic connection of the motor-pump unit 6 with the four linear actuator units 8 is such that the latter are acted upon by the hydraulic power unit via a downstream flow divider in hydraulic parallel connection.

The base structure and the lifting structure 3 of the hydraulic lifting column illustrated in FIGS. 2 to 7—in each case only to the extent of the upper section—are essentially identical to the lifting column according to FIG. 1, so that reference is made to the above explanations in this respect and the graphic representation can essentially be limited to the illustration of the specific head structure 2. With regard to said head structure 2, there are the relevant differences to the embodiment according to FIG. 1 explained below.

According to FIGS. 2 to 7, the head structure 2 comprises a cardanic lying surface suspension 23, comprising a head frame 24 to which the four upper piston rods 15o are attached, a crosshead 25 and a bearing unit 26 which supports a patient lying surface and thus forms a mechanical interface. The head frame 24—which has an opening—has a rectangular basic shape. The crosshead 25, which is arranged within the opening of the head frame 24, is mounted on the head frame 24 so that it can be pivoted about a first pivot axis X. For this purpose, two cylindrical receptacles 27 aligned with each other are designed on the head frame 24, in which bearing pins 28 are fixed, on which—via corresponding bearing bushes 29—the crosshead 25 is pivotably mounted. The bearing unit 26 is pivoted on the crosshead 25 around a second pivot axis Y, which cuts the first pivot axis X at a right angle. It comprises two supporting bodies 30, 31, which are rigidly connected to each other via a shaft 32 which passes through the crosshead 25 and which is mounted in the crosshead to rotate about the second pivot axis Y. Each of the two support bodies 30, 31 has two bearing surfaces 33 for the patient lying surface to be placed on the lying surface suspension 23; the corresponding fastening screws 34 are also illustrated as examples.

The lying surface suspension 23 also has a first swivel drive 35 between the head frame 24 and the crosshead 25 in the form of a hydraulic linear actuator 36. Its cylinder part 37 is articulated to a first swivel drive carrier 38 projecting downwards from the head frame 24. The associated piston rod 39 engages a steering arm 40 and is articulated thereto, wherein the steering arm 40 projects from a second swivel drive carrier 41, which in turn projects downwards from the crosshead 25. A stiffening bar 42 of the crosshead 25 can also be seen, which protrudes from the second swivel drive beam 41 opposite the steering arm 40. The cylinder part 43 of a second swivel drive 45—also provided as a hydraulic linear actuator 44—is hingewise connected to the second swivel drive carrier 41, which is effective between the crosshead 25 and the bearing unit 26 in such a way that the respective piston rod 46 is connected in an articulated manner and engages one of the two supporting bodies, namely the supporting body 31. The two hydraulic linear actuators 36, 44 are double-acting, so that their piston rods 39, 46 can be actively extended and retracted under the corresponding pressure of the two working chambers. Thus the crosshead 25 can be pivoted about the first pivot axis X in relation to the head frame 24 under the action of the first swivel drive 35. And under the action of the second swivel drive 45, the bearing unit 26 can be pivoted about the second pivot axis Y with respect to the crosshead 25.

The two swivel drives 35, 45 are arranged in such a way that when the head structure 2 is lowered—with the upper piston rods 15o retracting into the respective double cylinders 9—they are disposed within the space limited by the four struts 21 of the stiffening structure 20 of the cylinder assembly 18. The same applies to the first swivel drive carrier 38 and the second swivel drive carrier 41. Thus the head frame 24 can be lowered to the end plates 14 of the linear actuator units 8; and the head structure 2 nowhere projects laterally beyond the contour of the cylinder assembly 18.

The invention claimed is:

1. A Hydraulic Lifting column comprising:
    a base structure;
    a head structure; and
    a lifting structure, wherein
    the lifting structure comprising a hydraulic power unit and four hydraulic linear actuators extending between the base structure and the head structure, the hydraulic power unit acting on the hydraulic linear actuators;
    the lifting structure comprising the four hydraulic linear actuators with a mutually parallel, vertically oriented working direction;
    said four hydraulic linear actuators comprising four double cylinders;
    each hydraulic linear actuator comprising a double cylinder having two cylinder bores arranged next to one another and two piston structures with a plurality of piston rods oriented parallel to one another and extendable in opposite directions from the double cylinder;
    the totality of the plurality of piston rods including four upper piston rods and four lower piston rods;
    the four lower piston rods are connected to the base structure at corners of the base structure and the four upper piston rods are connected to the head structure at corners of the head structure;
    the four hydraulic linear actuators form a geometrical guide of the head structure relative to the base structure; and
    the four hydraulic linear actuators form the only geometrical guide of the head structure relative to the base structure.

2. The Hydraulic Lifting column according to claim 1, wherein
    the base structure is larger in area than the head structure.

3. The Hydraulic Lifting column according to claim 2, wherein
    said four double cylinders each have a one-piece base body in which the two cylinder bores are formed.

4. The Hydraulic Lifting column according to claim 3, further comprising:
    a cylinder assembly, wherein the cylinder assembly comprises the hydraulic power unit.

5. The Hydraulic Lifting column according to claim 4, wherein
    a tank being part of the hydraulic power unit connects two double cylinders of said four double cylinders to one another, thereby stiffening said two double cylinders of said four double cylinders against one another.

6. The Hydraulic Lifting column according to claim 5, wherein
    the cylinder assembly comprises a circumferential stiffening structure which extends over the four double cylinders and connects said four double cylinders to one another, the circumferential stiffening structure comprising struts which extend at the periphery of the cylinder assembly and which connect respectively two double cylinders to one another.

7. The Hydraulic Lifting column according to claim 6, wherein
    the four double cylinders are stiffened diagonally crosswise against one another.

8. The Hydraulic Lifting column according to claim 7, wherein
the cylinder assembly comprises a base plate on which the four double cylinders are disposed, a motor-pump unit of the hydraulic power unit being disposed between the four double cylinders on the base plate.

9. The Hydraulic Lifting column according to claim 8, wherein
the head structure has a lying surface suspension, a head frame to which the four upper piston rods are fastened, a crosshead and a bearing unit,
the crosshead is pivotably mounted on the head frame about a first pivot axis and the bearing unit is pivotally mounted on the crosshead about a second pivot axis, and
the first pivot axis and the second pivot axis intersect each other and/or wherein the lying surface suspension is a cardanic lying surface suspension.

10. The Hydraulic Lifting column according to claim 1, wherein
the Hydraulic Lifting column is an operating table.

11. The Hydraulic Lifting column according to claim 1, wherein
the base structure is larger in area than the head structure.

12. The Hydraulic Lifting column according to claim 1, wherein
the four double cylinders each have a one-piece base body in which the two-cylinder bores are formed.

13. A Lifting structure comprising:
a hydraulic power unit and four hydraulic linear actuators extending between a base structure and a head structure, the hydraulic power unit acting on the four hydraulic linear actuators;
the lifting structure comprising the four hydraulic linear actuators with a mutually parallel, vertically oriented working direction;
each hydraulic linear actuator of said four hydraulic linear actuators comprising a double cylinder having two-cylinder bores arranged next to one another and two piston structures with a plurality of piston rods oriented parallel to one another and extendable in opposite directions from the double cylinder;
the totality of the plurality of piston rods including four upper piston rods and four lower piston rods;
the four lower piston rods are connected to the base structure at corners of the base structure and the four upper piston rods are connected to the head structure at corners of the head structure;
the four hydraulic linear actuators form a geometrical guide of the head structure relative to the base structure; and
the four hydraulic linear actuators form the only geometrical guide of the head structure relative to the base structure.

* * * * *